United States Patent
Murakami et al.

(10) Patent No.: US 11,181,405 B2
(45) Date of Patent: Nov. 23, 2021

(54) CLAMP-TYPE ULTRASONIC FLOW MEASURING APPARATUS WITH A MOUNTER FOR PRESS TIGHT FIT OF A TRANSMISSION/RECEPTION UNIT TO THE MEASURING PIPE

(71) Applicant: RYUSOK CO., LTD., Okinawa-ken (JP)

(72) Inventors: Eiichi Murakami, Tokyo (JP); Kohei Sakiyama, Tokyo (JP)

(73) Assignee: RYUSOK CO., LTD., Okinawa-ken (JP)

( * ) Notice: Subject to any disclaimer, the term of this patent is extended or adjusted under 35 U.S.C. 154(b) by 157 days.

(21) Appl. No.: 16/585,765

(22) Filed: Sep. 27, 2019

(65) Prior Publication Data
US 2020/0132526 A1    Apr. 30, 2020

(30) Foreign Application Priority Data
Oct. 26, 2018  (JP) .............................. JP2018-201807

(51) Int. Cl.
G01F 1/66        (2006.01)
G01F 15/06       (2006.01)

(52) U.S. Cl.
CPC .............. *G01F 1/662* (2013.01); *G01F 1/667* (2013.01); *G01F 15/063* (2013.01)

(58) Field of Classification Search
None
See application file for complete search history.

(56) References Cited

U.S. PATENT DOCUMENTS

| | | | | |
|---|---|---|---|---|
| 4,069,433 A | * | 1/1978 | McShane | B06B 1/0674 310/325 |
| 4,297,607 A | * | 10/1981 | Lynnworth | B06B 1/067 310/327 |
| 5,131,278 A | * | 7/1992 | Baumoel | G01F 1/662 73/861.18 |
| 6,397,683 B1 | * | 6/2002 | Hagenmeyer | G01F 1/662 73/861.18 |

(Continued)

FOREIGN PATENT DOCUMENTS

| | | | | |
|---|---|---|---|---|
| JP | H10213467 A | | 8/1998 | |
| JP | 2001-108499 | * | 4/2001 | ............... G01F 1/66 |

(Continued)

*Primary Examiner* — Harshad R Patel
(74) *Attorney, Agent, or Firm* — Li & Cai Intellectual Property (USA) Office

(57) ABSTRACT

Transmission/reception units 1 are fixed to both sides of a pipe body P in a clamp type. The transmission/reception unit 1 has a mounter 3 provided with a through-hole 3c and a transmitter/receiver 4 inserted into the through-hole 3c. The transmitter/receiver 4 has a surface contact portion 4a, an element fixing portion 4b provided with an installation hole 4c, and a ultrasound transmitting body 4e installed in the installation hole 4c. A transmitting/receiving element 4h is attached on a top surface 4g of the ultrasound transmitting body 4e. When the mounter 3 is fastened, a force applied to the mounter 3 is transmitted to the surface contact portion 4a such that the surface contact portion 4a comes into close contact with the pipe body P, therefore an ultrasonic beam is transmitted smoothly between the pipe body P and the transmitting/receiving element 4h.

5 Claims, 4 Drawing Sheets

(56) References Cited

U.S. PATENT DOCUMENTS

| | | |
|---|---|---|
| 7,146,864 B2 | 12/2006 | Sullivan et al. |
| 10,107,786 B2 | 10/2018 | Fan |
| 2007/0107533 A1* | 5/2007 | Molenaar ................ G01F 1/662 |
| | | 73/856 |
| 2007/0251314 A1* | 11/2007 | Molenaar ................ G01F 1/662 |
| | | 73/201 |
| 2017/0160240 A1* | 6/2017 | Fan ........................ G01N 29/28 |
| 2018/0010941 A1* | 1/2018 | Baumoel ................ G01F 1/662 |
| 2019/0390990 A1* | 12/2019 | Krywyj ................ G01N 29/041 |
| 2020/0132526 A1* | 4/2020 | Murakami ............. G01F 1/667 |

FOREIGN PATENT DOCUMENTS

| | | |
|---|---|---|
| JP | 2003065818 A | 3/2003 |
| JP | 3841599 B2 | 11/2006 |
| JP | 2013174567 A | 9/2013 |

\* cited by examiner

CLAMP-TYPE ULTRASONIC FLOW MEASURING APPARATUS WITH A MOUNTER FOR PRESS TIGHT FIT OF A TRANSMISSION/RECEPTION UNIT TO THE MEASURING PIPE

FIELD OF THE DISCLOSURE

The present invention relates to a clamp-type ultrasonic flow measuring apparatus that propagates an ultrasonic beam in a fluid passing in a pipe body and measures a flow rate of the fluid.

BACKGROUND OF THE DISCLOSURE

A clamp-type ultrasonic flow measuring apparatus in which ultrasound transmitting/receiving elements are disposed around a pipe body by using a mounting jig is described in JP-A-10-221137, for example.

SUMMARY OF THE DISCLOSURE

In a clamp-type ultrasonic flow measuring apparatus, relative positions of ultrasound transmitting/receiving elements have to be adjusted depending on a diameter or a thickness of a pipe body when the clamp-type ultrasonic flow measuring apparatus is used. Hence, in order for an ultrasonic beam to be easily transmitted between the pipe body and one of the ultrasound transmitting/receiving elements, the ultrasound transmitting/receiving elements need to come into close contact with the pipe body with a strong pressing force.

However, the measuring device in JP-A-10-221137 has a very large size because several frames are disposed around the pipe body in order to adjust the ultrasound transmitting/receiving elements to preferred relative positions and press the transmitting/receiving elements to the pipe body with a strong pressing force.

An object of the invention is to solve such an above-described problem and provide an ultrasonic flow measuring apparatus in which it is possible to press an ultrasound transmitting/receiving element to a pipe body with a strong fixing force in a simple configuration.

An ultrasonic flow measuring apparatus relating to the invention for achieving the object described above includes a pair of transmission/reception units disposed to interpose a pipe body in which a fluid flows. The pair of the transmission/reception units has respective internally-provided ultrasound transmitting/receiving elements. A flow rate of the fluid is measured by the transmitting/receiving elements alternately transmitting and receiving ultrasonic beams propagating in the pipe body in an oblique direction between the transmitting/receiving elements of the transmission/reception units disposed at different positions along the pipe body. The transmission/reception unit has a mounter that comes into contact with an outer surface of the pipe body so as to perform mounting and a transmitter/receiver that is inserted into the mounter and is internally provided in the mounter. The mounter has a contact portion with the outer surface of the pipe body, a through-hole into which the transmitter/receiver is inserted, and fixing means for performing fixing to the pipe body. The transmitter/receiver has a plate-shaped surface contact portion which comes into surface contact with the pipe body, a force transmitting portion which is in contact with a part of the mounter, and an element fixing portion in which the transmitting/receiving element is installed, which is inserted into the through-hole and is fixed therein, and which has an end surface that serves as a part of the surface contact portion and comes into surface contact with the pipe body. When fixing of the mounter to the pipe body is performed by the fixing means, a fixing force generated through the fixing is transmitted to the transmitter/receiver via the force transmitting portion, and the surface contact portion is strongly pressed to the pipe body.

According to an ultrasonic flow measuring device of the invention, even in the case of a clamp type in which ultrasound transmitting/receiving elements are disposed on both sides of a pipe body, the ultrasound transmitting/receiving elements can come into reliably close contact with the pipe body with a strong pressing force in a simple configuration.

DETAILED DESCRIPTION OF THE EXEMPLARY EMBODIMENTS

Figure 1:
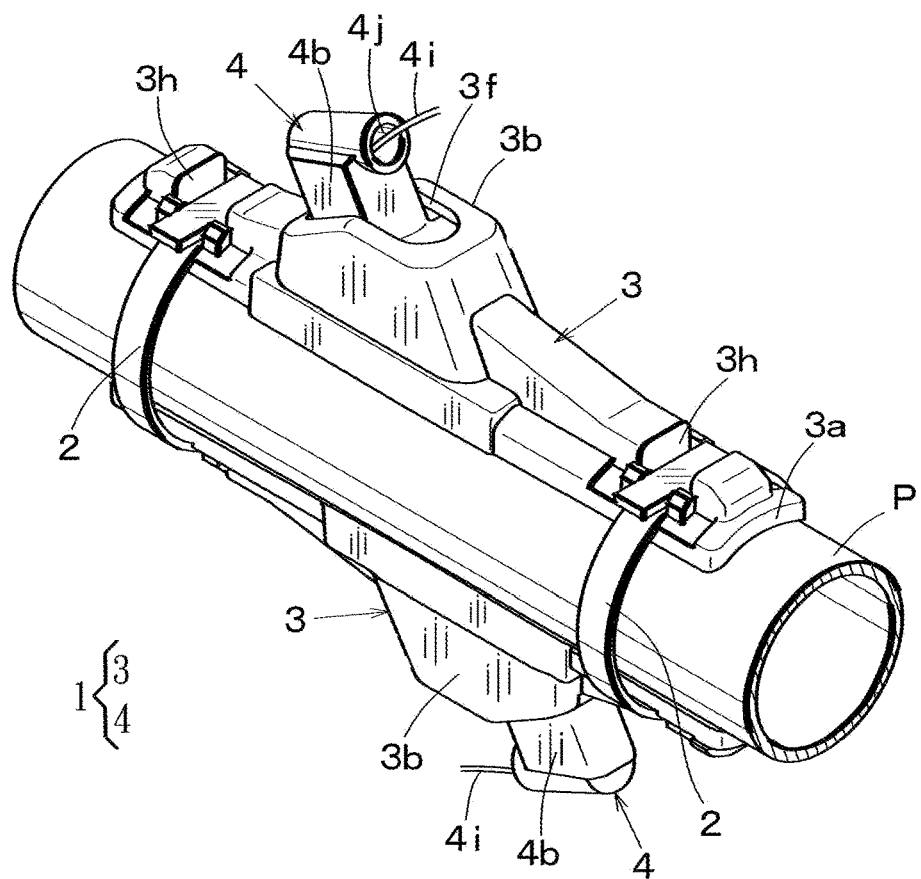
FIG. 1 is a perspective view of a state in which a pair of transmission/reception units is fixed to a pipe body.

The invention is described on the basis of examples illustrated in the drawings.

Figure 2:
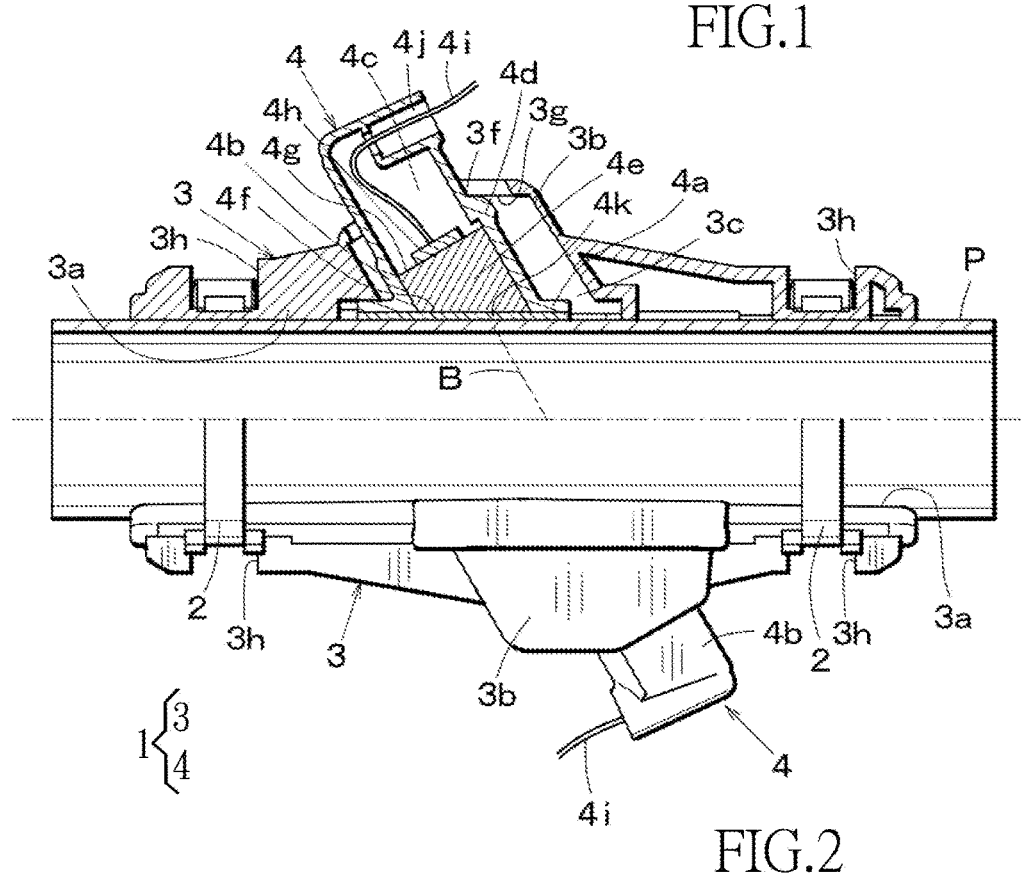
FIG. 2 is a sectional view of one transmission/reception unit when viewed from a side.

FIG. 1 is a perspective view of a state in which a pair of transmission/reception units is fixed to a pipe body, and FIG. 2 is a sectional view of one transmission/reception unit when viewed from a side.

A pair of transmission/reception units 1 made of a synthetic resin as a main material is fastened on both sides of a pipe body P in which a fluid to be measured flows, with a center axis of the pipe body being interposed between the pair of transmission/reception units, by two rubber, synthetic resin, or metal fastening bands 2 having an elastic force as fixing means, and the transmission/reception units are fixed in a clamp type. The two transmission/reception units 1 have the same shape and are disposed at bilaterally symmetrical positions on both sides of the pipe body P. The transmission/reception unit 1 has a mounter 3 that is fixed to the pipe body P and a transmitter/receiver 4 that is inserted into the mounter 3 and is internally provided in the mounter and is movable with respect to the mounter 3.

Figure 3:
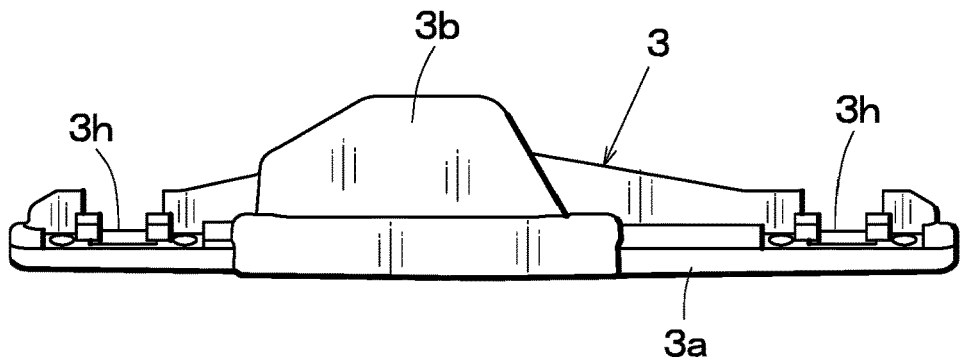
FIG. 3 is a front view of a mounter.
Figure 4:
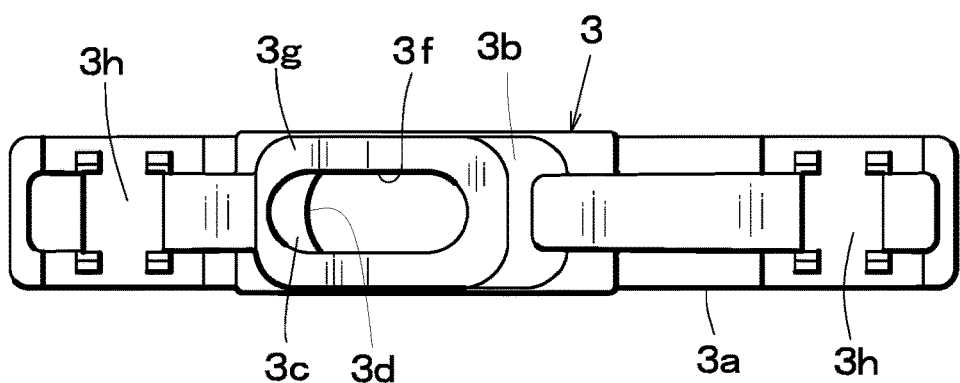
FIG. 4 is a plan view.
Figure 5:
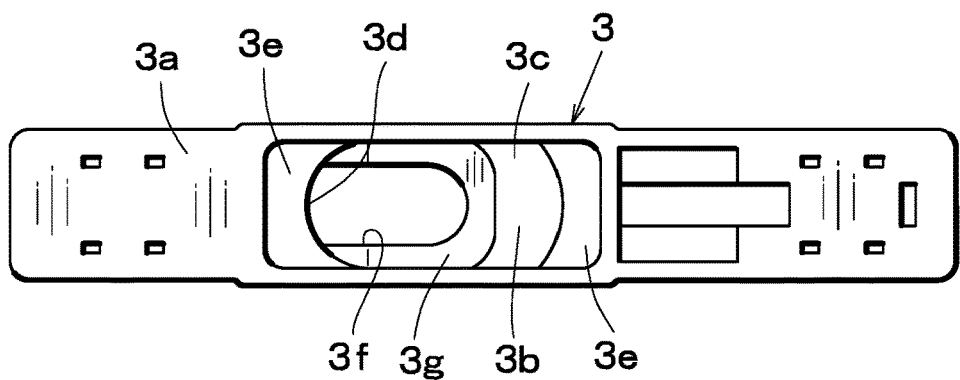
FIG. 5 is a bottom view.
Figure 6:
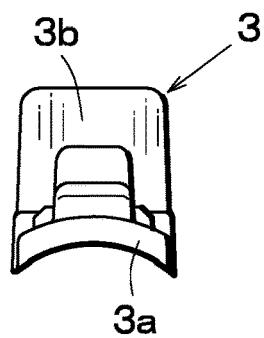
FIG. 6 is a side view.

FIG. 3 is a front view of the mounter 3, FIG. 4 is a plan view thereof, FIG. 5 is a bottom view thereof, and FIG. 6 is a side view thereof. The mounter 3 has an elongated piece-shaped contact portion 3a that comes into contact with an outer surface of the pipe body P in a longitudinal direction and is formed to have a contact surface being disposed along the outer surface of the pipe body P and having an arc-shaped cross-section. Both ends of the contact portion 3a are slightly raised upward and are slightly bent upward as the entire contact portion 3a. The contact portion 3a is provided with a trapezoidal portion 3b at a center part thereof, the trapezoidal portion 3b is provided with a through-hole 3c having substantially the same size as that of the transmitter/receiver 4, and the transmitter/receiver 4 is to be inserted into the through-hole 3c.

The through-hole 3c is provided with a substantially rectangular lower opening portion 3d in a lower portion thereof, the lower opening portion facing the contact portion 3a, and a small-recessed portion 3e is provided on the periphery of the lower opening portion 3d. In addition, the through-hole 3c is provided with an upper opening portion 3f in an upper portion thereof, and a peripheral edge portion 3g extending in an inward direction is formed to surround the upper opening portion 3f. Further, the contact portion 3a is provided with grooves 3h on both end portions in the longitudinal direction, the grooves being formed to dispose the fastening bands 2.

Figure 7:
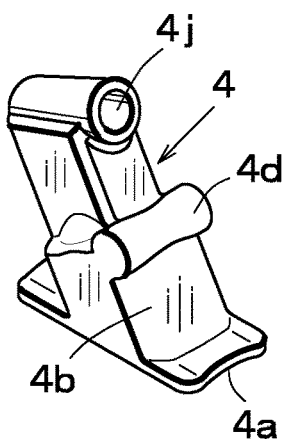
FIG. 7 is a perspective view of a transmitter/receiver when viewed from above.
Figure 8:
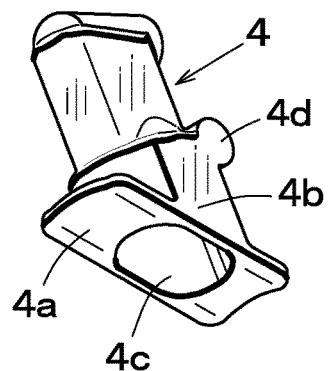
FIG. 8 is a perspective view of the transmitter/receiver when viewed from below.

FIG. 7 is a perspective view of the transmitter/receiver 4 when viewed from above. FIG. 8 is a perspective view thereof when viewed from below. A substantially rectangular plate-shaped surface contact portion 4a in a lower portion of the transmitter/receiver 4 has a size sufficient to cover the lower opening portion 3d of the mounter 3 and has a size and a thickness fitted to enter the recessed portion 3e on the periphery of the lower opening portion 3d. Hence, the surface contact portion 4a is disposed along the pipe body P and has an arc-shaped cross-section.

Figure 9:
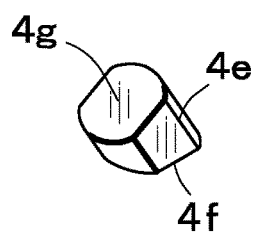
FIG. 9 is a perspective view of an ultrasound transmitting body.

An element fixing portion 4b that is inserted into the through-hole 3c of the mounter 3 is formed in an obliquely upward direction from a center portion of the surface contact portion 4a of the transmitter/receiver 4, the element fixing portion 4b is provided with an installation hole 4c therein, and the installation hole 4c is open to the surface contact portion 4a. In addition, a shaft 4d is provided as a force transmitting body in a short direction on an outer side of an intermediate portion of the element fixing portion 4b, and both end portions of the shaft 4d are to be in contact with an underside of the peripheral edge portion 3g on the periphery of the upper opening portion 3f. Hence, a columnar ultrasound transmitting body 4e made of a synthetic resin illustrated in FIG. 9 is installed in the installation hole 4c of the element fixing portion 4b in an upward direction from the surface contact portion 4a.

The ultrasound transmitting body 4e matches a shape of the installation hole 4c of the element fixing portion 4b, is fitted into the installation hole 4c, and is fixed therein with an adhesive. An underside 4f as an end surface of the ultrasound transmitting body 4e in a fitted state is disposed along the outer surface of the pipe body P so as to have an arc shape and is flush with the surface contact portion 4a so as to serve as a part of the surface contact portion 4a. In addition, an ultrasound transmitting/receiving element 4h that transmits and receives an ultrasonic beam by a piezoelectric element like a piezo element is attached on a top surface 4g of the ultrasound transmitting body 4e.

For example, the top surface 4g of the ultrasound transmitting body 4e is orthogonal to a centerline of the element fixing portion 4b, and thus the top surface 4g, on which the transmitting/receiving element 4h is attached, and the underside 4f to which an ultrasonic beam B is incident in an oblique direction with respect to the pipe body P are not parallel and are non-parallel to each other at a predetermined angle.

Hence, the center of the underside 4f of the ultrasound transmitting body 4e is positioned directly below the shaft 4d of the element fixing portion 4b, and stress downward from the peripheral edge portion 3g to the shaft 4d acts toward the center of the underside 4f.

A lead wire 4i is connected to the transmitting/receiving element 4h, and thus the lead wire 4i is laid out to an outside from a hole portion 4j in an upper portion through the element fixing portion 4b and is connected to an arithmetic control unit (not illustrated). Further, a silicon sheet 4k is attached as a soft elastic member on the surface contact portion 4a including the underside 4f of the ultrasound transmitting body 4e, for example, the soft elastic member having flexibility and acoustic impedance that matches that of a synthetic resin with respect to the ultrasonic beam B, as necessary, in order to improve a surface contact state with the pipe body P.

In installing of the transmitter/receiver 4 on the mounter 3, the transmitting/receiving element 4h, to which the lead wire 4i is connected, is attached on the top surface 4g of the ultrasound transmitting body 4e. The transmitter/receiver 4 in which the ultrasound transmitting body 4e is installed and fixed in the installation hole 4c of the element fixing portion 4b is inserted into the through-hole 3c from the lower opening portion 3d of the contact portion 3a. In this state, as illustrated in FIG. 1, an upper portion of the transmitter/receiver 4 projects upward from the upper opening portion 3f of the trapezoidal portion 3b.

Figure 10:
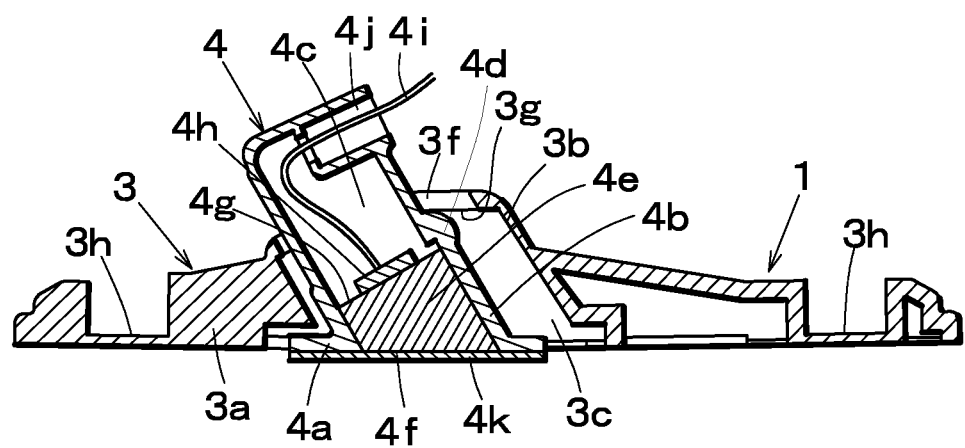
FIG. 10 is a sectional view of the transmission/reception unit before mounting to the pipe body is performed.

The shaft 4d of the transmitter/receiver 4 comes into contact with an underside of the peripheral edge portion 3g of the mounter 3, along with insertion of the mounter 3 of the transmitter/receiver 4 into the through-hole 3c, and thus it is not possible to further insert the transmitter/receiver 4 into the through-hole 3c. In this state, as illustrated in FIG. 10, the surface contact portion 4a of the transmitter/receiver 4 including the underside 4f of the ultrasound transmitting body 4e has a positional relationship in which the surface contact portion projects to a side of the pipe body P slightly more than the contact portion 3a of the mounter 3.

When the transmission/reception unit is used, the pair of transmission/reception units 1 symmetrically abuts the pipe body P on both sides, grease is applied for smooth transmission of the ultrasonic beam between the pipe body P and the silicon sheet 4k, and both sides of the transmission/reception unit 1 are strongly fixed to the pipe body P by using the fastening bands 2. The transmission/reception unit 1 of the example is manufactured to be fitted on an outer diameter of the pipe body P to be used, and thus the transmitter/receivers 4 of the pair of transmission/reception units 1 fixed to the pipe body P are disposed at opposite positions via the pipe body P in an oblique direction.

Both ends of the contact portion 3a of the mounter 3 are slightly raised upward, and thus both the ends of the contact portion 3a slightly float from the outer surface of the pipe body P, when the contact portion 3a abuts the pipe body P. Here, both the ends of the contact portion 3a are fastened by the fastening bands 2 such that the mounter 3 is fixed to the pipe body P. Consequently, both the ends of the contact portion 3a come into close contact with the pipe body P, the mounter 3 is strongly pressed in the vicinity of a center thereof to the pipe body P, and a strong pressing force toward the side of the pipe body P acts on the shaft 4d of the transmitter/receiver 4 from the peripheral edge portion 3g of the mounter 3. The surface contact portion 4a of the transmitter/receiver 4 including the underside 4f of the ultrasound transmitting body 4e projects to the side of the pipe body P slightly more than the contact portion 3a of the mounter 3, and thus the surface contact portion is strongly pressed between the mounter 3 and the pipe body P.

In addition, the mounter 3 and the transmitter/receiver 4 are partially deformed to absorb a pushing force due to elasticity of a material of the mounter 3 and the transmitter/receiver 4, and the surface contact portion 4a comes into intensely close contact with the outer surface of the pipe body P while being elastically pushed into the mounter 3. In particular, a strong pressing force acts on the underside 4f of the ultrasound transmitting body 4e, the underside being positioned below the shaft 4d.

The close contact of the underside 4f with the outer surface of the pipe body P due to such strong press results in smooth transmission and reception of the ultrasonic beam between the transmitting/receiving elements 4h via the pipe body P, and measurement accuracy is improved.

In addition, when the silicon sheet 4k is used, and even through gaps are partially formed between the outer surface of the pipe body P and the surface contact portion 4a of the transmitter/receiver 4, fastening by the fastening bands 2 results in a partial change in thickness of the silicon sheet 4k such that it is possible to fill the gaps to some extent, and thus the transmission of the ultrasonic beam is further smoothly performed.

As illustrated by a dotted line in FIG. 2, in response to a command from the arithmetic control unit through the lead wire 4i, the ultrasonic beam B transmitted from the transmitting/receiving element 4h of one transmission/reception unit 1 proceeds straightly in the ultrasound transmitting body 4e from the top surface 4g of the ultrasound transmitting body 4e, reaches the underside 4f, and is incident to the fluid from a wall surface of the pipe body P through the silicon sheet 4k. The ultrasonic beam B is further propagated in the fluid in the pipe body P in the oblique direction, is emitted from a wall surface of the pipe body P on an opposite side, and reaches the transmitting/receiving element 4h through the silicon sheet 4k and the ultrasound transmitting body 4e of the other transmission/reception unit 1.

In measuring of a flow rate of the fluid in the pipe body P, the transmitting/receiving elements 4h of the two transmitter/receivers 4 alternately transmit and receive the ultrasonic beams. The arithmetic control unit measures an arrival time difference between an ultrasonic beam propagating along flow of the fluid and an ultrasonic beam propagating against the flow and obtains a flow speed of the fluid. Further, the arithmetic control unit calculates the flow rate by multiplying a sectional area of the pipe body P and the flow speed. A method of calculating the flow speed and the flow rate is already known as a time difference method of an ultrasound flowmeter, and thus the description thereof is omitted.

Incidentally, in the description of the specification, an up-down direction and a right-left direction are described with reference to the drawings of the examples, and thus actual members are not limited to the provided terms.

REFERENCE SIGNS LIST

1 Transmission/reception unit
2 Fastening band
3 Mounter
3a Contact portion
3b Trapezoidal portion
3c Through-hole
3d Lower opening portion
3f Upper opening portion
4 Transmitter/receiver
4a Surface contact portion
4b Element fixing portion
4c Installation hole
4d Shaft
4e Ultrasound transmitting body
4f Underside
4g Top surface
4h Ultrasound transmitting/receiving element
4i Lead wire
4k Silicon sheet
B Ultrasonic beam
P Pipe body

What is claimed is:

1. An ultrasonic flow measuring apparatus comprising:
a pair of transmission/reception units disposed to interpose a pipe body in which a fluid flows; and
fixing means for fixing the pair of transmission/reception units to the pipe body;
wherein the pair of the transmission/reception units has respective internally-provided ultrasound transmitting/receiving elements, so that a flow rate of the fluid is measured by the ultrasound transmitting/receiving elements alternately transmitting and receiving ultrasonic beams propagating in the pipe body in an oblique direction between the transmission/reception units,
wherein the pair of the transmission/reception units is made of a synthetic resin, and each of the transmission/reception units has a mounter that comes into contact with an outer surface of the pipe body so as to perform mounting and a transmitter/receiver that is inserted into the mounter and is internally provided in the mounter, wherein the transmitter/receiver each includes the ultrasound transmitting/receiving element respectively,
wherein the mounter has an elongated piece-shaped contact portion coming into contact with the outer surface of the pipe body in a longitudinal direction and a through-hole into which the transmitter/receiver is inserted, wherein the contact portion has both ends that are slightly raised upward and bent upward as the entire contact portion in the longitudinal direction, and the through hole is provided at a center part of the contact portion;
wherein the transmitter/receiver has a plate-shaped surface contact portion which comes into surface contact with the pipe body, and an element fixing portion in which the ultrasound transmitting/receiving element is installed and is fixed, wherein the surface contact portion projects to a side of the pipe body more than the contact portion of the mounter, the element fixing portion has an end surface that comes into contact with the pipe body to serve as a part of the surface contact portion, and a force transmitting body being in contact with a part of the mounter is provided at the element fixing portion,
wherein the fixing means are disposed on both the ends of the contact portion of each mounter in the longitudinal direction, and
wherein, when the pair of transmission/reception units symmetrically abuts both sides of the pipe body, each transmitter/receiver of the pair of transmission/reception units is disposed at opposite positions via the pipe body, and fixing of each mounter of the pair of transmission/reception units to the pipe body is performed by fastening both the ends of each contact portions floated from the outer surface of the pipe body with the fixing means, each mounter is strongly pressed in the vicinity of a center thereof to the pipe body, a strong pressing force generated through the fixing is transmitted to each transmitter/receiver via each force transmitting body, and each surface contact portion is strongly pressed to the pipe body.

2. The ultrasonic flow measuring apparatus according to claim 1,
wherein a soft elastic member is attached on the surface contact portion disposed along the pipe body.

3. The ultrasonic flow measuring apparatus according to claim 2,
wherein the element fixing portion of the transmitter/receiver is provided with an installation hole, a columnar ultrasound transmitting body having an end surface and a lead wire, the end surface is flush with the surface contact portion and the ultrasound transmitting/receiving element mounted on an opposite surface is installed and fixed in the installation hole, and the lead wire is connected to the ultrasound transmitting/receiving element and is laid out to an outside.

4. The ultrasonic flow measuring apparatus according to claim 1,
wherein the strong pressing force applied to the force transmitting body of the transmitter/receiver from the mounter by the fixing means is transmitted to the surface contact portion of the transmitter/receiver, the surface contact portion being positioned below the force transmitting body.

5. The ultrasonic flow measuring apparatus according to claim 1,
wherein the element fixing portion of the transmitter/receiver is provided with an installation hole, a columnar ultrasound transmitting body having an end surface and a lead wire, the end surface is flush with the surface contact portion and the ultrasound transmitting/receiving element mounted on an opposite surface is installed and fixed in the installation hole, and the lead wire is connected to the ultrasound transmitting/receiving element and is laid out to an outside.

* * * * *